United States Patent
Yamada

Patent Number: 5,194,109
Date of Patent: Mar. 16, 1993

[54] METHOD FOR RECOVERING SCRAPS OF MULTI-LAYER PLASTIC SHEET OR FILM

[75] Inventor: Toyokazu Yamada, Himeji, Japan

[73] Assignee: Idemitsu Petrochemical Co., Ltd., Tokyo, Japan

[21] Appl. No.: 890,358

[22] Filed: May 22, 1992

Related U.S. Application Data

[63] Continuation of Ser. No. 426,968, Oct. 25, 1989.

Foreign Application Priority Data

Nov. 14, 1988 [JP] Japan ................... 63-285704

[51] Int. Cl.$^5$ .................. B32B 35/00; B29B 17/00
[52] U.S. Cl. ..................... 156/94; 156/344; 209/11; 264/37
[58] Field of Search ............. 156/584, 94, 344; 209/11; 264/37

[56] References Cited

U.S. PATENT DOCUMENTS

| | | | |
|---|---|---|---|
| 3,620,860 | 11/1971 | Eckardt | 156/344 X |
| 4,199,109 | 4/1980 | Watanabe | 156/344 X |
| 4,319,938 | 3/1982 | Vires | 156/344 X |
| 4,599,131 | 7/1986 | Matuszak | 156/344 X |
| 4,715,920 | 12/1987 | Ruppman et al. | 264/37 X |
| 4,808,482 | 2/1989 | Benge et al. | 264/37 X |
| 4,956,033 | 9/1990 | Martin et al. | 156/344 X |

FOREIGN PATENT DOCUMENTS

| | | |
|---|---|---|
| 0031797 | 7/1981 | European Pat. Off. |
| 0096517 | 6/1983 | Japan ............... 156/344 |
| 0142115 | 8/1984 | Japan ............... 156/344 |
| 62-152707 | 7/1987 | Japan . |
| 62-288015 | 12/1987 | Japan . |
| 63-202409 | 8/1988 | Japan . |
| 5379975 | 6/1989 | Japan . |

Primary Examiner—Caleb Weston
Assistant Examiner—Mark A. Osele
Attorney, Agent, or Firm—Frishauf, Holtz, Goodman & Woodward

[57] ABSTRACT

A method for recovering and reusing a scrap multilayer plastic sheet or film comprising at least a base material layer and laminated with an adhesive resin comprising at least one of an ethylene-vinyl acetate copolymer, a styrene-isoprene copolymer, a styrene-butadiene copolymer, a styrene-methyl methacrylate copolymer and an ethylene-acrylic acid ester-maleic anhydride copolymer. The method comprises heating the scrap multilayer sheet or film to a temperature lower than the softening point of the base material layer to make the interlaminar peeling strength of the adhesive resin lower than the strength at break of a layer having the lowest strength at break, except for the adhesive layer, and separating the multilayer scrap into at least two scrap layers and recovering at least one scrap layer in sheet or film form. The present invention provides effective reuse of scrap with almost no reduction in physical properties. Furthermore the cost of the production or molding of the sheet can be reduced. Still further, it is not necessary to add an additive, a white pigment and the like for preventing thermal deterioration. When polypropylene is used as a base material in the present method, it is not necessary to use low viscosity polypropylene as is conventionally required. That is, since high viscosity polypropylene can be used, vacuum molding becomes easy and furthermore a multilayer sheet or film having desirable physical properties can be produced very economically.

21 Claims, 1 Drawing Sheet

METHOD FOR RECOVERING SCRAPS OF MULTI-LAYER PLASTIC SHEET OR FILM

This application is a continuation of application Ser. No. 07/426,968, filed Oct. 25, 1989.

BACKGROUND OF THE INVENTION

1. Field of the Invention

The present invention relates to a method for recovering scraps of a multi-layer plastic sheet or film to be used as a wrapping material, for example More particularly, the present invention relates to a method for recovering scraps of a multi-layer sheet or film comprising different plastics for their effective reuse.

2. Background Information

With diversity of a manner of living, a wrapping material having a variety of functions has been desired in recent years. Thus a plastic material excellent in oxygen gas barrier properties and thermal resistance is desired to be developed in place of the conventional metallic can or glass bottle.

However, a single plastic material cannot meet the characteristics required. Thus a multi-layer sheet or film comprising different plastics or plastic films and metal films is increasingly used. For example, a multi-layer sheet or film comprising polyvinylidene chloride (hereinafter referred to as "PVDC"), an ethylene-vinyl alcohol copolymer (hereinafter referred to as "EVOH") or the like, which is excellent in oxygen barrier properties, and polypropylene (hereinafter referred to as "PP"), crystalline polyethylene terephthalate (hereinafter referred to as "crystalline PET") or the like, which is excellent in thermal resistance, is now widely used as a wrapping material for precooked food, particularly as a wrapping material for use in an electric range.

For production of such multi-layer sheets or films, a lamination method in which films are once produced and then laminated with an adhesive, for example, a coextrusion method in which a plurality of resins are extruded from different extruders and laminated by the use of a feed block or a multi-layer die, and a coextrusion lamination method which is a combination of the above lamination and coextrusion methods are well known.

The most important technical subject in use of the above multi-layer sheet or film is recovery of scraps produced at the time of production or fabrication thereof. In the case of a single plastic product, the reuse of the plastic can be usually achieved without a marked reduction in physical properties by carrying out its self-cycling. However, a serious problem is encountered in recovery of a multi-layer sheet or film as described above.

That is, in general, scraps produced at the time of production of a multi-layer sheet or film or at the time of its fabrication such as thermoforming are pulverized as such and recovered into a PP layer (a base material layer).

However, PVDC contained in the scraps or an adhesive resin is contained in the PP layer, causing a reduction in physical properties such as stiffness, impact strength and transparency.

Moreover, an oxygen gas barrier resin such as PVDC is generally high in heat sensitivity and particularly at a fabrication temperature of PP, is readily subject to thermal decomposition, causing problems such as discoloration and finally carbonization, and formation of black spots in the product.

When PVDC or an adhesive resin is contained in the PP layer (base material layer), for example, in the case of a multi-layer sheet or film having the construction: PP/adhesive resin/PVDC/adhesive resin/PP, PVDC or the adhesive resin is present in the surface layer, they cause problems such as corrosion of the inner surface of die and adhesion to the surface of a cooling metallic roll to be used in production of sheets and so on.

Therefore the following methods are employed in order to reuse in a stabilized manner scraps recovered (recovered starting material).

(1) Use of a special screw

Since PP, EVA, and PVDC having different extrusion characteristics are present together, a double fright type screw is used or a special plating is applied taking into a consideration a difference in melting initiation temperature.

(2) In order to prevent thermal deterioration of the recovered starting material, a thermal deterioration preventing additive is added.

(3) As PP to be used as the recovered layer, a low viscosity PP making an extrusion temperature not more than 210° C. is used.

Even by these methods, however, the PP layer is decreased in mechanical properties such as stiffness and impact resistance because scraps contain low thermal resistant resins such as PVDC, EVA and an adhesive resin. Moreover, baking and discoloration inevitably occur. To make discoloration unmarked, it is necessary to add a large amount of an additive, e.g., a white pigment to the PP layer.

To overcome the problems due to the presence of PVDC or adhesive resin in the surface layer, it is necessary to provide another layer not containing scraps on the surface of the above layer. This makes the equipment very complicated.

Recovering scraps into the base material layer (PP layer) means introduction of expensive PVDC and adhesive resin into inexpensive PP layer. It is remarkably uneconomical.

The present inventors made extensive investigations to overcome the above prior art problems. As a result, it has been found that scraps can be reused without a reduction in physical properties and economically by separating them into at least two layers and recoverying each layer separated into the corresponding layer. Based on the findings, the present invention has been accomplished. That is, in accordance with the present invention, scraps are not pulverized for recovery and reuse thereof.

SUMMARY OF THE INVENTION

The present invention provides a method for recovering scraps of a multi-layer plastic sheet or film for reuse thereof which comprises separating the scraps into at least two layers and recovering them.

Figure 1:
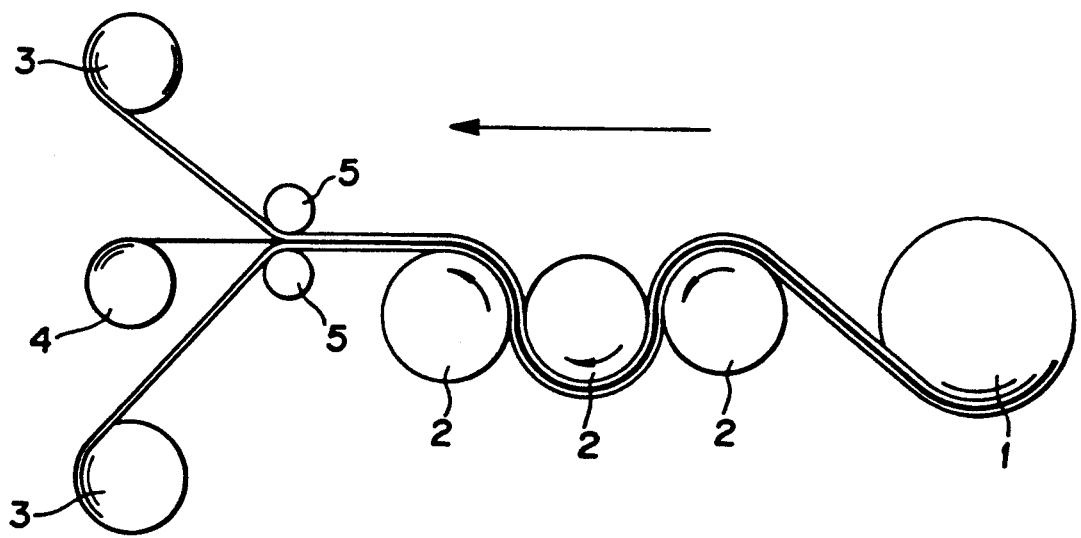
FIG. 1 is a schematic drawing which illustrates a method for separation and recovery of a multi-layer sheet in Example 1.

In the drawing, 1 indicates a multi-layer sheet; 2, a heating roll; 3, a base material resin; 4, an adhesive resin and a barrier resin; and 5, a separation roll.

DETAILED DESCRIPTION OF THE INVENTION

The multi-layer plastic sheet or film to be used in the present invention contains at least a base material layer.

As a material constituting the base material layer, a thermoplastic resin is used. Examples of the thermoplastic resin include homopolymers of olefins, such as polypropylene and polyethylene, copolymers of propylene, ethylene and the like with other α-olefins such as ethylene, propylene and butene-1, mixtures of the above polymers, and ester polymers such as polyethylene terephthalate and polycarbonate. Of these polymers, polypropylene and polyethylene terephthalate are particularly preferred for use in that they are excellent in thermal resistance.

The multi-layer plastic sheet or film to be used in the present invention may be a sheet or film comprising a combination of at least two base material layers. Usually, layers other than the base material layer are used in combination depending on the purpose of use.

Examples of such layers include an oxygen gas barrier layer, a carbon dioxide barrier layer, and a steam barrier layer. In particular, an at least two layer laminate of a oxygen gas barrier layer and a base material layer (particularly made of a resin excellent in thermal resistance) is preferred.

Examples of the material constituting the oxygen gas barrier layer include resins excellent in oxygen gas barrier properties, such as polyvinylidene chloride (PVDC), polyvinyl chloride-polyvinylidene chloride copolymer, vinylidene chloride-acrylic acid ester copolymer, and ethylene-vinyl alcohol copolymer (EVOH). In addition, a metallic foil can be used.

The multi-layer plastic sheet or film to be used in the present invention is usually produced by laminating the above layers with an adhesive resin by the use of means such as coextrusion.

Adhesive resin which can be used include an ethylene-vinyl acetate copolymer, a styrene-isoprene copolymer, a styrene-butadiene copolymer, a styrene-methyl methacrylate copolymer, and an ethylene-acrylic acid ester-maleic anhydride copolymer.

As well as the above sheet or film obtained by laminating with an adhesive resin, the multi-layer plastic sheet or film to be used in the present invention may be a sheet or film obtained by coextruding the above resins constituting the layers without use of the adhesive resin, or a sheet or film obtained by laminating by application of surface treatment such as supersonic waves or irradiation with microwaves.

The feature of the present invention is that in reuse of scraps produced at the time of production or fabrication such as thermoforming of the multi-layer plastic sheet or film obtained above, the above scraps are recovered by separation into at least two layers.

In order to separate the scraps into at least two layers, it is necessary to make the interlaminar peeling strength of the scraps smaller than the strength at break of the base material layer, for example, a polypropylene layer. If the interlaminar peeling strength of the scraps is greater than the strength at break of the base material layer, the base material layer is broken before completion of peeling and the objects of the present invention cannot be attained.

When an adhesive resin is used, it is necessary to make the peeling strength of the adhesive resin smaller than the strength at break of the oxygen gas barrier resin or base material layer.

In the present invention, basically, scraps are separated into at least two layers, and each layer thus separated is recovered into the corresponding layer. However, since the multi-layer plastic sheet or film has a necessary and sufficient adhesive strength (peeling strength) in view of its practical use, it is not easy to separate the layers.

As a result of investigations on temperature dependency of an adhesive strength of adhesive resin, it has been found that the adhesive strength can be decreased to an extent that the layers can be peeled apart, by raising the temperature.

That is, peeling includes interfacial peeling and coagulation peeling, and it is considered that the adhesive strength is a complex force of an intermolecular force in the interface between an adhesive material and a material to be bonded, and an intermolecular force between adhesive materials Although it has been found that raising the temperature is effective to weaken these intermolecular forces, this is not always the same with the case when the material contains a reactive group. When the material contains a reactive group, the intermolecular force in the interface between the adhesive material and the material to be bonded is increased to an extent exceeding a decrease in the coagulation force of each material, and as a result, the adhesive strength (peeling strength) is increased.

When the base material layer is made of polypropylene, if the adhesive resin is an ethylene-vinyl acetate copolymer or a styrene-isoprene-styrene copolymer, the coagulation force of the adhesive resin itself abruptly drops with an increase of temperature. Thus, coagulation peeling occurs and the peeling strength seriously drops.

On the other hand, if modified polypropylene is used as the adhesive resin and as the oxygen gas barrier layer, an ethylene-vinyl alcohol copolymer is used, since they leave reactive groups therebetween, the peeling strength rather increases when the temperature increases beyond a certain level; even if the polypropylene is diluted to weaken its adhesive force, this cannot be eliminated.

When polypropylene is used as the base material resin and modified polypropylene, as the adhesive resin, the interlaminar peeling strength is very high since they have a good compatibility. Therefore, even if the temperature rises, the interlaminar peeling strength never becomes smaller than the strength at break of the base material resin.

Therefore, in order to lower the interlaminar peeling strength by raising the temperature, it is important that there is no reactive group between the adhesive resin and the base material, and their compatibility is not so good.

As described above, the interlaminar peeling strength can be made smaller than the strength at break of the base material by raising the temperature (heating). This heating means is not critical and for example, a heat roll, hot air, infrared rays, heater, etc. can be employed. The heating temperature varies with the type of the resin and so on, and is difficult to determine unconditionally; it is sufficient to be not more than the softening point of the base material layer. When an adhesive resin is used, it is preferred from a viewpoint of handling that the temperature of the adhesive resin is 30° to 70° C.

In practice, it is preferred to heat at such a temperature that the interlaminar peeling strength is not more than 50%, particularly not more than 20% of the strength at break of the base material at ordinary temperature. In connection with this value, when a commodity resin as described above is used, it is sufficient to make the peeling strength not more than 5.0 kg/25 mm width. From a viewpoint of production of a peeling apparatus, it is particularly preferred to make the peeling strength not more than 2.0 kg/25 mm width.

Then, scrap material heated as described above are separated. This separation of each layer is preferred to be conducted by the use of a roll. Use of a roll permits continuous separation, which is advantageous from an industrial standpoint. The base material layer thus separated may be wound on another roll or may be pulverized as such.

The adhesive resin layer is separated (peeled apart) from the resin exhibiting a poor adhesive strength to the adhesive resin. When an oxygen gas barrier resin is used, if the adhesive strength between the oxygen gas barrier resin and the adhesive resin is greater than the adhesive strength to the base material resin, the adhesive resin along with the oxygen gas barrier resin is peeled apart from the base material resin.

Each layer thus separated is basically recovered into the respective layer and reused.

That is, the base material layer separated is generally pulverized and then recovered into the base material layer. No serious reduction in physical properties is observed since they are of the same material. On the other hand, it is difficult to separate the separated layer consisting of the adhesive resin layer and the oxygen gas barrier resin layer. Thus, by producing a multi-layer plastic sheet or film having a new construction as shown below by molding the separated layer comprising the adhesive resin layer and the oxygen gas barrier layer by the use of an extruder separately provided, more effective reuse of scraps can be realized because the sheet or film thus obtained exhibits suitable oxygen gas barrier properties.

(i) PP/adhesive resin/adhesive resin+PVDC as separated/adhesive resin/PVDC/adhesive resin/PP (ii) PP/adhesive resin/adhesive resin+PVDC as separated/PVDC/adhesive resin/PP In accordance with the present invention, effective reuse of scraps can be realized with almost no reduction in physical properties, and the cost at the time of production or molding of the sheet can be decreased.

In the present invention, it is not necessary to add an additive, a white pigment and the like for preventing thermal deterioration.

When PP is used as a base material, it is not necessary to use low viscosity PP unlike that in the conventional methods. That is, since high viscosity PP can be used, vacuum molding becomes easy and furthermore a multi-layer sheet or film excellent in physical properties can be produced very economically.

Accordingly the process of the present invention is industrially very useful.

The present invention is described in greater detail with reference to the following examples.

REFERENCE EXAMPLE 1

(1) Production of Standard Sample A

Coextrusion molding was carried out by the use of three extruders, a 3-type 5-layer feed block and a T-die.

Polypropylene (PP) (Idemitsu Polypro E-100G, Melt Index (MI)=0.5 g/10 minute, produced by Idemitsu Petrochemical Co., Ltd.), an ethylene-vinyl acetate copolymer (EVA) (Ultrasen UE-634, produced by Toso Co., Ltd.) as an adhesive resin, and polyvinylidene chloride (PVDC) (XOS 5253.16, produced by Dow Chemical Corp.) were extruded at the same time, respectively, from the first extruder (65 mm $\phi$), the second extruder (50 mm $\phi$) and the third extruder (50 mm $\phi$), and then coextrusion molded by the use of the 3-type 5-layer feed block and the T-die to obtain a multi-layer sheet standard sample A (thickness 0.8 mm) having a construction shown in Table 1.

(2) Measurement of Peeling Strength

A strip-like sample (25 mm wide, 150 mm long) was cut off from the standard sample A to prepare a test piece. This test piece was mounted on a tensile tester equipped with a thermostat, and the peeling strength 5 minutes after the temperature of the thermostat showed a predetermined value was measured. The surface temperature of the adhesive layer of the test piece after this measurement was immediately measured and referred to as a "peeling strength measuring point temperature". At this time, the pulling speed was 50 mm/minute. The results are shown in Table 2.

In this sample, peeling occurred between PP and the adhesive resin EVA.

REFERENCE EXAMPLE 2

(1) Production of Standard Sample B

A multi-layer sheet standard sample B (thickness 0.8 mm) having a construction shown in Table 1 was produced in the same manner as in Reference Example 1 (1) except that a styrene-isoprene-styrene copolymer (SIS) (Tr-1107 produced by Shell Chemical Co., Ltd.) was used as the adhesive resin.

(2) Measurement of Peeling Strength

A strip-like sample was prepared in the same manner as in Reference Example 1 (2) except that the standard sample B obtained in (1) above was used, and measured for peeling strength. The results are shown in Table 2. In this sample, peeling occurred between PP and the adhesive resin SIS.

COMPARATIVE REFERENCE EXAMPLE 1

(1) Production of Standard Sample C

A multi-layer standard sample C (thickness 0.8 mm) having a construction shown in Table 1 was produced in the same manner as in Reference Example 1 (1) except that a mixture of 50 wt % of maleic anhydride-modified polypropylene (modified PP) (Idemitsu Polytack E-100 produced by Idemitsu Petrochemical Co., Ltd.) and 50 wt % of unmodified polypropylene (Idemitsu Polypro F-200S produced by Idemitsu Petrochemical Co., Ltd.) was used as the adhesive resin, and an ethylene-vinyl alcohol copolymer (EVOH) (Eval EP-F101B produced by Kuraray Corp.) was used as the barrier layer resin.

(2) Measurement of Peeling Strength

A strip-like sample was produced in the same manner as in Reference Example 1 (2) except that the standard sample C as obtained in (1) above was used, and measured for peeling strength. The results are shown in Table 2. In this sample, peeling occurred between EVOH and modified PP as an adhesive resin. In this example, in production of the test piece, unmodified PP was compounded to modified PP to positively decrease the peeling strength.

TABLE 1

| Sample | First Layer (Base Material Layer) | Second Layer (Adhesive Resin Layer) | Third Layer (Barrier Layer) | Fourth Layer (Adhesive Resin Layer) | Fifth Layer (Base Material Layer) |
| --- | --- | --- | --- | --- | --- |
| A | PP | EVA | PVDC | EVA | PP |
| B | PP | SIS | PVDC | SIS | PP |
| C | PP | modified PP | EVOH | modified PP | PP |
| Layer Ratio (vol %) | 45 | 3 | 4 | 3 | 45 |

TABLE 2

| Sample | Peeling Strength (kg/25 mm) (Values in the parentheses indicate adhesive layer surface temperature (°C.)) |
| --- | --- |
| A | 0.8(23), 0.55(36), 0.12(50), 0.13(55) |
| B | 1.15(23), 0.45(37), 0.50(38), 0.01(58), 0.01(60) |
| C | 1.70(23), 1.70(37), 1.85(38), 1.60(55), 1.46(58), 2.90(86), 3.10(88) |

From the results of the above samples A and B, it can be seen that the peeling strength drops with an increase of temperature. The reason for this is considered that as the temperature rises, the coagulation force of the adhesive resin itself abruptly drops and coagulation peeling occurs.

On the other hand, if reactive groups are left as in the sample C, when the temperature rises beyond a certain level, the peeling strength rather increases.

EXAMPLE 1

(1) Separation of Sheet

The standard sample A obtained in Reference Example 1 (1) was passed through heating rolls in such a manner that the sheet surface temperature was 70° C. (surface temperature of the adhesive layer, about 50° C.), and then separated into three layers (PP; EVA/PVDC/EVA; PP) as illustrated in FIG. 1 by the use of a rotary roll. At this time, the interlaminar peeling strength between the PP layer and the EVA layer in the second layer was 0.12 kg/25 mm, and the strength at break of the PP layer was 22.5 kg. The strength at break of the PVDC layer in the second layer was 1.6 kg. At this time, the sheet was separated into the PP layer (PP sheet) and the PVDC layer containing the adhesive resin layer (EVA layer).

(2) Reuse of Sheet

A multi-layer sheet (thickness 0.8 mm) having a construction shown below was produced in the same manner as in Reference Example 1 (1) except that the PP sheet separated in (1) above (hereinafter referred to as "recovered PP") was pulverized with the usual pulverizing machine, and then compounded to PP as the base material layer in a proportion of 50 wt %. This multi-layer sheet was measured for physical properties and the results are shown in Table 3 along with the results of measurement of physical properties of the standard sample A. As a result, it was found that in the multi-layer sheet, almost no reduction in physical properties as compared with the standard sample A was observed.

| PP + Recovered PP/EVA/PVDC/EVA/PP + Recovered PP | |
| --- | --- |
| Layer Ratio (vol %) | 45/3/4/3/45 |

EXAMPLE 2

(1) Separation of Sheet

Sheet separation was carried out in the same manner as in Example 1 (1) except that there was used the same standard sample A as in Reference Example 1 (1) with the exception that the type of the polypropylene was changed to Idemitsu Polypro F-200S, MI=2.0 g/10 minute, produced by Idemitsu Petrochemical Co., Ltd. As in Example 1 (1), the sheet was separated into three layers. The interlaminar peeling strength between the PP layer and the EVA layer in the second layer was 0.12 kg/25 mm, the strength at break of the PP layer was 22.5 kg, and the strength at break of the PVDC layer in the second layer was 1.6 kg.

(2) Reuse of Sheet

A multi-layer sheet was produced in the same manner as in Example 1 (2) except that the PP sheet separated as in (1) above (recovered PP) was used. The results of measurement of physical properties of the sheet are shown in Table 3. As a result, it was found that in this multi-layer sheet, almost no reduction in physical properties as compared with the standard sample A was observed.

EXAMPLE 3

Reuse of Sheet

A three-layer laminate sheet comprising EVA and PVDC separated and recovered in Example 1 (1) (EVA/PVDC/EVA) and the same resin as used in Example 1 (2) were coextruded by the use of a screw exclusively designed for a film (sheet) to produce a multi-layer sheet (thickness 0.8 mm) having a construction shown below. At this time, PP separated and recovered in Example 1 (1) (recovered PP) was compounded to the PP layer in a proportion of 50 wt %. The feed block used satisfied the following construction. The results of measurement of physical properties of the multi-layer thus obtained are shown in Table 3. This multi-layer sheet was excellent in oxygen gas barrier performance although it was inferior in optical characteristics to the standard sample A.

| PP + Recovered PP/EVA/EVA + PVDC (recovered)/EVA/PVDC/EVA/PP + Recovered PP | |
| --- | --- |
| Layer Ratio (vol %) | 40/3/7/3/4/3/40 |

EXAMPLE 4

Reuse of Sheet

A PP layer not containing recovered PP was provided on the outside of the layer containing the recovered PP in Example 1 (2) to produce a 4-type 7-layer multi-layer sheet (thickness 0.8 mm). The results of measurement of physical properties of the multi-layer sheet are shown in Table 3. This multi-layer sheet exhibited physical properties equivalent to those of the standard sample A.

| PP/PP + Recovered PP/EVA/PVDC/EVA/PP + Recovered PP/PP | |
| --- | --- |
| Layer Ratio (vol %) | 5/40/3/4/3/40/5 |

EXAMPLE 5

(1) Separation of Sheet

The standard sample B obtained in Reference Example 2 (1) was separated into three layers (PP;SIS/PVDC/SIS;PP) in the same manner as in Example 1 (1). The interlaminar peeling strength between the PP layer and the SIS layer in the second layer was 0.05 kg/25 mm, the strength at break of the PP layer was 22.5 kg, and the strength at break of the PVDC layer in the second layer was 1.6 kg.

(2) Reuse of Sheet

A multi-layer sheet having a construction shown below (thickness 0.8 mm) was produced in the same manner as in Reference Example 2 (1) except that the PP sheet separated in (1) above (recovered PP) was pulverized by the use of the usual pulverizing machine and then compounded to PP as the base material layer in a proportion of 50 wt %. The results of measurement of physical properties of the multi-layer are shown in Table 3 along with the results of measurement of the physical properties of the standard sample B. This multi-layer sheet exhibited physical properties equivalent to those of the standard sample B.

| PP + Recovered PP/SIS/PVDC/SIS/PP + Recovered PP | |
| --- | --- |
| Layer Ratio (vol %) | 45/3/4/3/45 |

EXAMPLE 6

Reuse of Sheet

A three-layer laminate sheet comprising SIS and PVDC separated and recovered in Example 5 (1) (SIS/PVDC/SIS) and the same resin as used in Example 5 (2) were coextruded by the use of a screw exclusively designed for a film (sheet) to produce a multi-layer sheet (thickness 0.8 mm) having the following construction. In the PP layer, PP separated and recovered in Example 5 (1) (recovered PP) was compounded in a proportion of 50 wt %. The results of measurement of physical properties of the multi-layer sheet are shown in Table 3. This multi-layer sheet was excellent in oxygen gas barrier performance although it is inferior in optical characteristics to the standard sample B.

| PP + Recovered PP/SIS/SIS + PVDC (recovered)/SIS/PVDC/SIS/PP + Recovered PP | |
| --- | --- |
| Layer Ratio (vol %) | 40/3/7/3/4/3/40 |

COMPARATIVE EXAMPLE 1

Reuse of Scraps

A multi-layer sheet (sheet thickness 0.8 mm) having a construction shown below was produced in the same manner as in Reference Example 1 (1) except that a multi-layer sheet pulverized product obtained by pulverizing the standard sample A obtained in Reference Example 1 (1) was compounded to PP as the base material layer in a proportion of 50 wt %. The results of measurement of physical properties of the multi-layer sheet are shown in Table 3. In this multi-layer sheet, black spots considered to be carbon resulting from thermal deterioration of PVDC were formed and the sheet was markedly colored in yellow with process of time in production.

| PP + Multi-layer pulverized product/EVA/PVDC/EVA/PP + Multi-layer pulverized product | |
| --- | --- |
| Layer Ratio (vol %) | 45/3/4/3/45 |

COMPARATIVE EXAMPLE 2

Reuse of Scraps

A multi-layer sheet (thickness 0.8 mm) having a construction shown below was produced in the same manner as in Example 1 (1) except that a multi-layer sheet pulverized product obtained by pulverizing the multi-layer sheet as obtained in Example 2 (1) (with the exception that the type of polypropylene in the standard sample A was changed to Idemitsu Polypro F-200S) was compounded to PP as the base material layer in a proportion of 50 wt %. The results of measurement of physical properties of the multi-layer sheet are shown in Table 3. This multi-layer sheet was markedly colored in yellow as compared with the multi-layer sheet obtained in Example 2 (1).

| PP + Multi-layer pulverized product sheet/EVA/PVDC/EVA/PP + Multi-layer pulverized product sheet | |
| --- | --- |
| Layer Ratio (vol %) | 45/3/4/3/45 |

COMPARATIVE EXAMPLE 3

Reuse of Scraps

A multi-layer sheet (thickness 0.8 mm) having a construction shown below was produced in the same manner as in Reference Example 2 (1) except that a multi-layer sheet pulverized product obtained by pulverizing the standard sample B obtained in Reference Example 2 (1) was compounded to PP as the base material layer in a proportion of 50 wt %. In this multi-layer sheet, many black spots considered to be carbon resulting from thermal deterioration of PVDC were formed and the sheet was markedly colored in yellow with a lapse of time in production.

| PP + Multi-layer pulverized product sheet/SIS/PVDC/SIS/PP + Multi-layer pulverized product sheet | |
| --- | --- |
| Layer Ratio (vol %) | 45/3/4/3/45 |

COMPARATIVE EXAMPLE 4

The sample C obtained in Comparative Reference Example 1 was passed through heating rolls in such a manner that the sheet surface temperature was 70° C. (resin temperature of the adhesive layer, about 50° C.). The interlaminar peeling strength was not decreased, and it was not possible to peel apart the layers from one another with ease.

Thus, in this case, recovery of the sheet by separation was impossible.

Ltd.), an ethylene-vinyl acetate copolymer (EVA) (Utrasen UE-634 produced by Toso Co., Ltd.) and high density polyethylene (HDPE) (Idemitsu Polyethylene 440M produced by Idemitsu Petrochemical Co., Ltd.) were coextruded to produce a 1 mm thick multi-layer sheet. A 25 mm wide×150 mm long strip-like was cut off from the multi-layer sheet and measured for interlaminar peeling strength between HIPS and EVA at ordinary temperature (23° C.). The results are shown in Table 4. At the time of measurement, the layers were separated from each other without breakage.

REFERENCE EXAMPLE 4

The strip-like sample obtained in Comparative Reference Example 3 was measured for interlaminar peeling strength at 60° C. The results are shown in Table 4. At the time of measurement, the two layers were separated

TABLE 3

| | Modulas in Tension (kg/cm$^2$) | Elongation (%) | Olsen Stiffness (kg/cm$^2$) | Impact Strength in Tension (MD/TD) (kg · cm/cm$^2$) | Degree of Permeation of Oxygen (ml/m$^2$ · 24 hr) | Degree of Permeation of Steam (g/m$^2$ · 24 hr) | YI Value | Haze (%) | Appearance of Sheet |
| --- | --- | --- | --- | --- | --- | --- | --- | --- | --- |
| Example 1 | 13,100/12,800 | 500/490 | 8,400/8,300 | 120/115 | 1.8 | 1.7 | 20 | 80 | good |
| Example 2 | 13,500/13,300 | 500/470 | 8,800/8,700 | 125/120 | 1.8 | 1.7 | 14 | 76 | good |
| Example 3 | 12,300/12,200 | 510/510 | 7,900/7,800 | 130/125 | 1.5 | 1.8 | 24 | 86 | good |
| Example 4 | 13,200/12,900 | 500/480 | 8,500/8,300 | 120/115 | 1.8 | 1.7 | 18 | 78 | good |
| Example 5 | 13,000/12,700 | 540/520 | 8,100/8,100 | 140/130 | 1.8 | 1.8 | 22 | 82 | good |
| Example 6 | 12,500/12,300 | 550/540 | 7,900/7,600 | 145/135 | 1.6 | 1.8 | 26 | 88 | good |
| Comparative Example 1 | 12,400/12,200 | 490/480 | 7,800/7,600 | 90/85 | 1.8 | 2.6 | 42 | 94 | Coloration in yellow, formation of carbon |
| Comparative Example 2 | 12,600/12,500 | 480/450 | 7,900/7,800 | 88/80 | 1.8 | 2.4 | 38 | 92 | Coloration in yellow, formation of carbon |
| Comparative Example 3 | 12,00/11,600 | 470/460 | 7,500/7,300 | 90/85 | 1.8 | 2.6 | 4 | 94 | Coloration in yellow, formation of carbon |
| Comparative Example 4 | | | | impossible to recover by peeling | | | | | |
| Standard Sample A | 13,200/13,000 | 520/510 | 8,500/8,300 | 130/125 | 1.8 | 1.7 | 18 | 78 | good |
| Standard Sample B | 13,500/13,300 | 500/470 | 8,800/8,700 | 125/120 | 1.8 | 1.7 | 14 | 75 | good |
| Standard Sample C | 13,000/12,800 | 560/530 | 8,200/8,100 | 140/135 | 1.8 | 1.8 | 18 | 76 | good |

COMPARATIVE REFERENCE EXAMPLE 2

Polypropylene (PP) (Idemitsu Polypro E-100G produced by Idemitsu Petrochemical Co., Ltd.) and high density polyethylene (HDPE) (Idemitsu Polyethylene 440M produced by Idemitsu Petrochemical Co., Ltd.) were coextruded to produce a 1 mm thick two-layer sheet. A strip-like sample (25 mm width×150 mm length) was cut off from the two-layer sheet and measured for interlaminar peeling strength at ordinary temperature (23° C.). The results are shown in Table 4. At the time of measurement, the two layers were separated from each other without breakage.

REFERENCE EXAMPLE 3

A strip-like sample as obtained in Comparative Reference Example 2 was measured for interlaminar peeling strength at 60° C. The results are shown in Table 4. At the time of measurement, the two layers were separated from each other without breakage.

COMPARATIVE REFERENCE EXAMPLE 3

High impact resistant polystyrene (HIPS) (Idemitsu Styrol ET-61 produced by Idemitsu Petrochemical Co., from each other with breakage.

TABLE 4

| | Multi-Layer Construction (Layer Thickness ($\mu$)) | Heating Temperature (°C.) | Peeling Strength kg/25 mm width |
| --- | --- | --- | --- |
| Comparative Reference Example 2 | PP/HDPE (900/100) | 23 (room temperature) | 1.2 |
| Reference Example 3 | PP/HDPE (900/100) | 60 | 0.5 |
| Comparative Reference Example 2 | HIPS/EVA/HDPE (850/50/100) | 23 (room temperature) | 1.5 |
| Reference Example 4 | HIPS/EVA/HDPE (850/50/100) | 60 | 0.1 |

What is claimed is:

1. A method for recovering and reusing a scrap multi-layer sheet or film comprising at least a plastic base material layer and laminated with an adhesive resin comprising at least one resin selected from the group consisting of an ethylene-vinyl acetate copolymer, a styrene-isoprene copolymer, a styrene-butadiene copolymer, a styrene-methyl methacrylate copolymer and an ethylene-acrylic acid ester-maleic anhydride copolymer, said method comprising heating said scrap multilayer sheet or film to a temperature lower than the softening point of said base material layer to make the peeling strength of said adhesive resin lower than the strength at break of a layer having the lowest strength at break, except for said adhesive layer, said temperature being 30° C. to 70° C., wherein the adhesive resin does not adhere to the base material layer and separating said multilayer scrap into at least two scrap layers, whereby the adhesive resin is separated from the base material layer and recovering and reusing at least one of said scrap layers in sheet or film form.

2. The method as claimed in claim 1 wherein the multi-layer sheet or film has an oxygen gas barrier resin and is a laminate prepared using an adhesive resin, and the peeling strength of the adhesive resin is made smaller than the strength at break of the oxygen gas barrier resin or the base material layer.

3. The method as claimed in claim 2, wherein the oxygen gas barrier layer comprises a resin selected from the group consisting of polyvinylidene chloride, polyvinyl chloride-polyvinylidene chloride copolymer, vinylidene chloride-acrylic acid ester copolymer and ethylene-vinyl alcohol copolymer.

4. The method as claimed in claim 2, wherein the oxygen gas barrier layer comprises a metal foil.

5. The method as claimed in claim 2, wherein said base material layer comprises polypropylene and said oxygen barrier layer comprises an ethylene-vinyl alcohol copolymer.

6. The method as claimed in claim 2, wherein said base material layer comprises a thermoplastic resin selected from the group consisting of a homopolymer of polypropylene; a homopolymer of polyethylene; a copolymer of propylene with an α-olefin selected from the group consisting of ethylene, propylene and butene-1; a copolymer of ethylene with an α-olefin selected from the group consisting of ethylene, propylene and butene-1; polyethylene terephthalate and polycarbonate and said oxygen gas barrier layer comprises a metal foil or a resin selected from the group consisting of polyvinylidene chloride, polyvinyl chloride-polyvinylidene chloride copolymer, vinylidene chloride-acrylic acid ester copolymer and ethylene-vinyl alcohol copolymer.

7. The method as claimed in claim 1, wherein said base material layer comprises a thermoplastic resin selected from the group consisting of homopolymers of olefins, copolymers of propylene with α-olefins, copolymers of ethylene with α-olefins, and ester polymers.

8. The method as claimed in claim 7, wherein said heating is conducted at a temperature such that the peeling strength is not more than 20% of the strength at break of the base material.

9. The method as claimed in claim 7, wherein the peeling strength is not more than 2.0 kg/25 mm width.

10. The method as claimed in claim 1, wherein said base material layer comprises a thermoplastic resin selected from the group consisting of a homopolymer of polypropylene; a homopolymer of polyethylene; a copolymer of propylene with an α-olefin selected from the group consisting of ethylene, propylene and butene-1; a copolymer of ethylene with an α-olefin selected from the group consisting of ethylene, propylene and butene-1; polyethylene terephthalate and polycarbonate.

11. The method as claimed in claim 1, wherein the multilayer sheet or film comprises a carbon dioxide barrier layer.

12. The method as claimed in claim 1, wherein the multilayer sheet or film comprises a steam barrier layer.

13. The method as claimed in claim 1, wherein said base material layer comprises polypropylene and said adhesive resin comprises an ethylene-vinyl acetate copolymer or a styrene-isoprene-styrene copolymer.

14. The method as claimed in claim 1, wherein said heating is conducted at a temperature such that the peeling strength is not more than 50% of the strength at break of the base material.

15. The method as claimed in claim 1, wherein the peeling strength is not more than 5.0 kg/25 mm width.

16. The method as claimed in claim 1 wherein the multilayer sheet or film comprises in the following order: polypropylene/adhesive resin+polyvinylidene chloride/adhesive resin/polyvinylidene chloride/adhesive resin/polypropylene, wherein the polyvinylidine chloride in the adhesive resin+polyvinylidene chloride is separated out.

17. A method for recovering and reusing a scrap multilayer plastic sheet or film comprising
   (a) as a first base material layer, a first layer comprising (i) polypropylene, (ii) polypropylene and recovered polypropylene or (iii) polypropylene and a multilayer pulverized product,
   (b) as a first adhesive resin, disposed on said first layer, a second layer comprising an ethylene-vinyl acetate copolymer or a styrene-isoprene-styrene copolymer,
   (c) as an oxygen gas barrier layer, disposed on said second layer, a third layer comprising polyvinylidene chloride,
   (d) as a second adhesive resin, disposed on said third layer, a fourth layer comprising an ethylene-vinyl acetate copolymer or a styrene-isoprene-styrene copolymer and
   (e) as a second base material layer, disposed on said fourth layer, a fifth layer selected from the group consisting of (i) polypropylene, (ii) polypropylene and recovered polypropylene and (iii) polypropylene and a multilayer pulverized product,
   said method comprising (A) heating said scrap multilayer sheet or film to a temperature lower than the softening point of said base material layer to make the peeling strength of said adhesive resin lower than the strength at break of a layer having the lowest strength at break, except for said adhesive layer, said temperature being 30° C. to 70° C., wherein the first adhesive resin and the second adhesive resin both adhere to the oxygen barrier layer, the first adhesive resin does not adhere to the first base material and the second adhesive resin does not adhere to the second base material layer, (B) separating said multilayer scrap into at least two scrap layers, whereby the first adhesive resin is separated from the first base material and the second adhesive resin is separated from the second base material and (C) recovering and reusing at least one of said scrap layers in sheet or film form.

18. The method as claimed in claim 17, wherein
   the first layer comprises polypropylene,
   the second layer comprises an ethylene-vinyl acetate copolymer,
   the third layer comprises polvinylidene chloride, the fourth layer comprises an ethylene-vinyl acetate copolymer and the fifth layer comprises polypropylene.

19. The method as claimed in claim 17, wherein the first layer comprises polypropylene, the second layer comprises a styrene-isoprene-styrene copolymer, the third layer comprises polyvinylidene chloride, the fourth layer comprises a styrene-isoprene-styrene copolymer and the fifth layer comprises polypropylene.

20. The method as claimed in claim 17, wherein the first layer comprises polypropylene and recovered polypropylene, the second layer comprises an ethylene-vinyl acetate copolymer, the third layer comprises polyvinylidene chloride, the fourth layer comprises an ethylene-vinyl acetate copolymer and the fifth layer comprises polypropylene and recovered polypropylene.

21. The method as claimed in claim 17, wherein the first layer comprises polypropylene and recovered polypropylene, the second layer comprises a styrene-isoprene-styrene copolymer, the third layer comprises polyvinylidene chloride, the fourth layer comprises a styrene-isporene-styrene copolymer and the fifth layer comprises polypropylene and recovered polypropylene.

* * * * *